(12) United States Patent
Brown

(10) Patent No.: US 7,416,196 B2
(45) Date of Patent: Aug. 26, 2008

(54) TUGGER CART WITH ROTATING PLATFORM

(76) Inventor: Edmund W. Brown, 8715 Gittings Rd., Racine, WI (US) 53406

( * ) Notice: Subject to any disclaimer, the term of this patent is extended or adjusted under 35 U.S.C. 154(b) by 274 days.

(21) Appl. No.: 10/820,924

(22) Filed: Apr. 8, 2004

(65) Prior Publication Data

US 2005/0226708 A1 Oct. 13, 2005

(51) Int. Cl.
*B62B 3/02* (2006.01)
*B62B 3/04* (2006.01)

(52) U.S. Cl. .............................. 280/79.11; 280/47.371; 108/142; 248/349.1

(58) Field of Classification Search ................. 414/373, 414/462; 280/79, 79.2, 508, 509, 510, 47.371, 280/79.11; 248/349.1; 108/142; 104/47; 410/1
See application file for complete search history.

(56) References Cited

U.S. PATENT DOCUMENTS

| | | | | | |
|---|---|---|---|---|---|
| 1,344,900 | A | * | 6/1920 | Juresisin ...................... 108/142 |
| 2,712,452 | A | * | 7/1955 | Bennett et al. ........... 280/79.11 |
| 3,720,336 | A | * | 3/1973 | Murray et al. ............... 414/470 |
| 3,757,972 | A | * | 9/1973 | Martin ........................ 414/537 |
| 3,830,385 | A | * | 8/1974 | Young ......................... 414/536 |
| 3,945,521 | A | * | 3/1976 | Decker ........................ 414/483 |
| 4,229,060 | A | * | 10/1980 | Brownlee et al. ............ 312/305 |
| 4,360,211 | A | * | 11/1982 | Blake ........................ 280/79.7 |
| 4,637,626 | A | * | 1/1987 | Foss et al. .................... 280/655 |
| 4,850,604 | A | * | 7/1989 | Le Marchand et al. ...................... 280/33.996 |
| 5,024,175 | A | * | 6/1991 | Epstein .................... 112/217.2 |
| 5,259,720 | A | * | 11/1993 | Lobner ........................ 414/483 |
| 5,328,192 | A | * | 7/1994 | Thompson ............... 280/47.24 |
| 5,462,298 | A | * | 10/1995 | Bodine .................... 280/47.34 |
| 5,547,205 | A | * | 8/1996 | do Rosario Sousa de Cabedo .................... 280/30 |
| 5,622,299 | A | * | 4/1997 | Berard ........................ 224/403 |
| 5,938,396 | A | * | 8/1999 | Audet ........................ 414/490 |
| 6,364,331 | B1 | * | 4/2002 | Yap ........................ 280/47.371 |
| 6,467,746 | B1 | * | 10/2002 | Paskiewicz .............. 248/349.1 |
| 6,860,493 | B2 | * | 3/2005 | Orozco .................. 280/33.991 |
| 2007/0057477 | A1 | * | 3/2007 | Brown ........................ 280/79.2 |

OTHER PUBLICATIONS

Topper Industrial website www.topperindustrial.com from Jan. 2003.*

* cited by examiner

*Primary Examiner*—James Keenan
(74) *Attorney, Agent, or Firm*—Boyle Fredrickson, S.C.

(57) ABSTRACT

A tugger cart is provided for transporting a load about a factory or the like. The tugger cart includes a support frame and a wheel assembly operatively connected to the support frame for supporting the support frame above a supporting surface. A bed is rotatably mounted to the support frame and is rotatable about a vertical bed axis that extends through the center of the bed. The bed may be locked in a predetermined position by a user. The tugger cart also includes a handle assembly slidably connected to the support frame. The handle assembly is movable between a first retracted position and a second extended position.

17 Claims, 6 Drawing Sheets

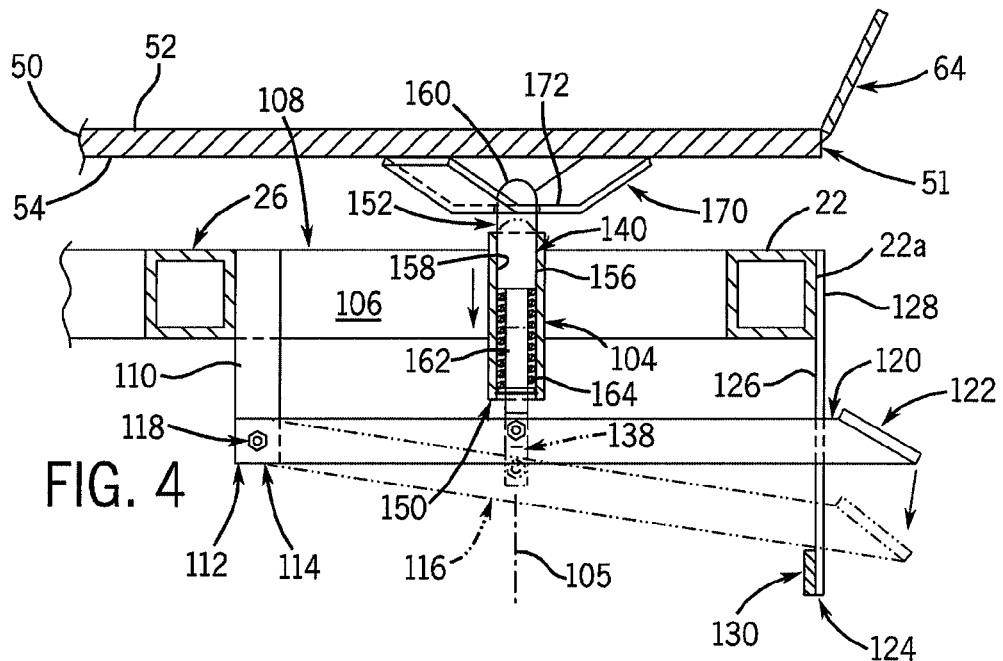
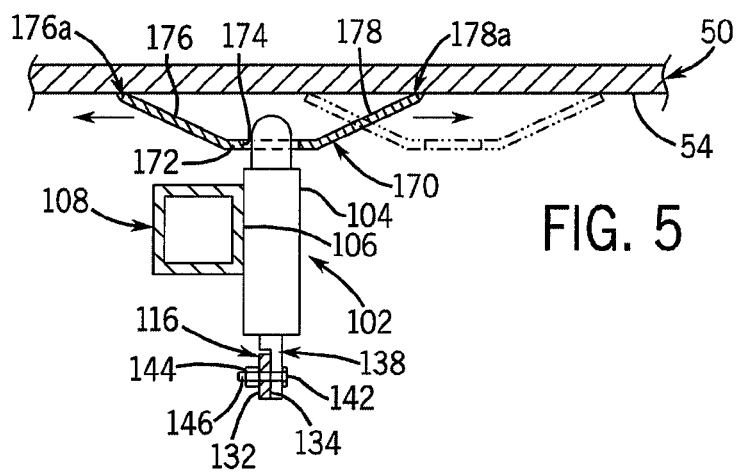
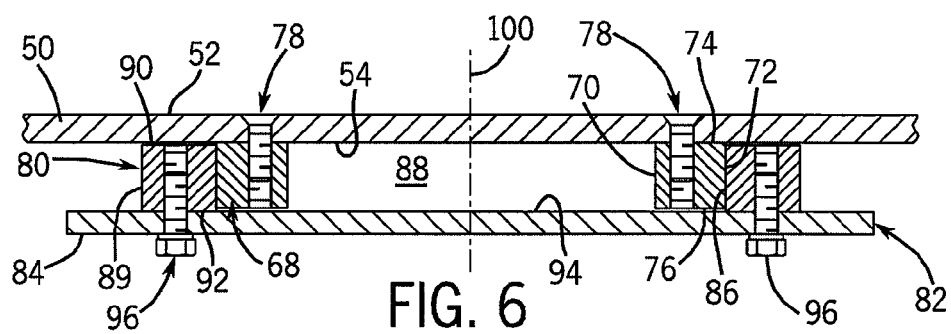

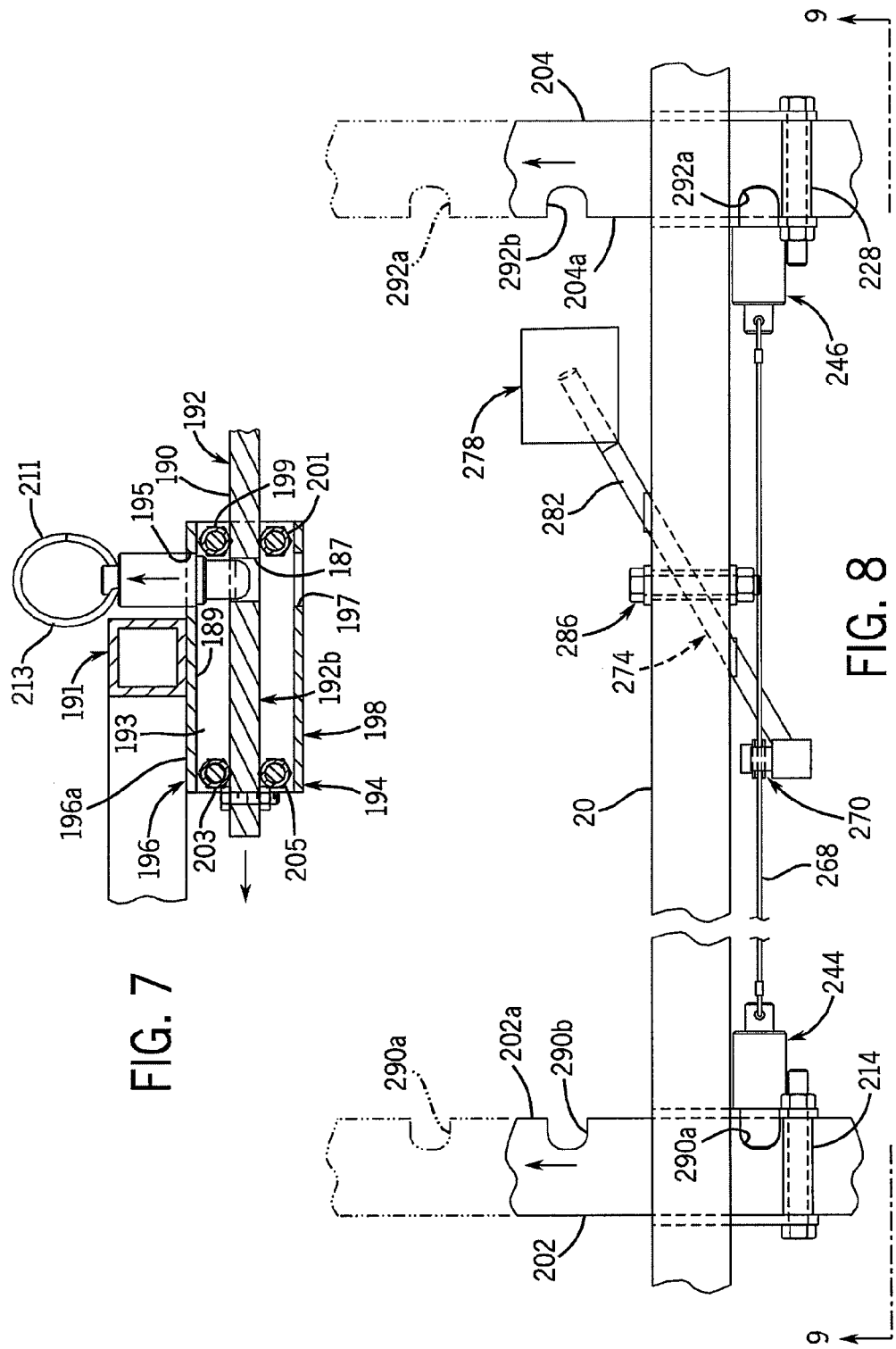

TUGGER CART WITH ROTATING PLATFORM

FIELD OF THE INVENTION

This invention relates generally to wheeled carts, and in particular, to a tugger cart having a rotatable support platform for transporting materials received thereon about a factory or the like.

BACKGROUND AND SUMMARY OF THE INVENTION

In order to transport pallets, containers and materials throughout a factory, wheeled tugger carts are often used. These tugger carts allow an individual to deliver the pallets, containers and materials to the desired workstation in the factory. It can be appreciated that when transporting containers or the like to various locales throughout a factory, these containers must often be unloaded or removed from the tugger cart in order to allow access to the user to the desired container to be delivered at the workstation. However, there may be insufficient space at the desired workstation to temporarily place the container(s) removed from the tugger cart. Hence, it is highly desirable to provide a tugger cart with a temporary storage capability for supporting containers intended to be transported on the tugger cart.

It can be further appreciated that the pallets, containers or materials transported on the tugger carts must often be reorientated when delivered to a desired workstation. For example, a pallet may have to be reorientated at the workstation in order to allow for access to the pallet by a forklift. Alternatively, a container delivered to a desired workstation may require the container to be orientated in a certain manner to allow access to the interior thereof. When the pallets, containers or materials transported on a tugger cart are of significant size and/or weight, it may be difficult for a user to reorientate the pallet, container or material delivered to the workstation. Consequently, it is highly desirable to provide a tugger cart which allows for a user to more easily orientate the pallets, containers, or materials transported thereon.

Therefore, it is a primary object and feature of the present invention to provide a tugger cart for transporting pallets, containers and materials throughout a factory that is simple to use and inexpensive to manufacture.

It is a still further object and feature of the present invention to provide a tugger cart for transporting pallets, containers and materials throughout a factory that allows for a user to reorientate the pallets, containers and materials supported thereon.

It is a still further object and feature of the present invention to provide a tugger cart for transporting pallets, containers, and materials throughout a factory that provides a secondary support structure for temporarily supporting a portion of the containers and/or materials transported by the tugger cart.

In accordance with the present invention, a tugger cart is provided for transporting a load. The tugger cart includes a support frame and a bed having a center. The bed is rotatably mounted to the support frame and is rotatable about a bed axis perpendicular to the bed and extends through the center of the bed. A wheel assembly is operatively connected to the support frame for supporting the support frame above a support surface.

The tugger cart also includes a handle assembly slidably connected to the support frame. The handle assembly is movable between a first retracted position and a second extended position. The handle and the assembly includes a generally horizontal leg having a first end slidably connected to the support frame and an opposite second end. A lower arm projects from the leg and an upper arm is pivotably connected to the lower arm. The upper arm is pivotable between an extended position wherein the upper arm is generally co-planar to the lower arm in the retracted position. A locking structure is operatively connected to the support frame for locking the leg of the handle assembly in a user desired position.

The handle assembly further includes a load support member extending from the lower arm and a bracing arm extending between the leg and the load support member. The load support member includes a load support arm extending upwardly from the lower arm of the handle assembly and a retaining plate extending vertically from a terminal end of the load support arm.

A bed locking structure is provided for locking the bed in a selected position on the support frame. The bed locking structure includes a retractable pin operatively connected to the locked support frame. The pin is movable along a vertical pin axis between an extended position and a retracted position. The pin axis is a predetermined radial distance from the bed axis. A locking plate is connected to the bed and has an aperture therethrough for receiving the retractable pin.

In accordance with a further aspect of the present invention, a tugger cart is provided for transporting a load. The tugger cart includes a support frame having an end and a bed received in the support frame. A wheel assembly is operatively connected to the support frame for supporting the support frame above the supporting surface. The handle assembly is slidably connected to the support frame adjacent the end thereof. The handle assembly is movable toward and away from the end of the support frame to a plurality of user selected positions.

The handle assembly includes a generally horizontal leg having a first end slidably connected to the support frame and an opposite, second end. A lower arm projects from the leg and an upper arm is pivotably connected to the lower arm. The upper arm is pivotable between an extended position wherein the upper arm is generally co-planar with the lower arm and a retracted position. A locking structure is provided for locking the leg of the handle assembly in one of the user selected positions.

The handle assembly also includes a load support member extending from the lower arm. A bracing element extends between the leg and the load support member. The load support member includes a load supporting arm extending upwardly from the lower arm of the handle assembly and a retaining leg extending vertically from the terminal end of the load support arm.

It is contemplated for the bed to have a center and to lie in a generally horizontal plane. The bed is rotatable on the support frame about a vertical bed axis that extends through the center of the bed. A bed locking structure is provided for locking the bed at a selected position on the support frame. The bed locking structure includes a retractable pin operatively connected to the support frame. The pin is movable along a vertical pin axis between the extended position and a retracted position. The pin axis is a predetermined radial distance from the bed axis. A locking plate is connected to the bed and has a bed aperture therethrough. The bed aperture has a center being a predetermined radial distance from the bed axis. The locking plate includes a horizontal base having first and second opposite sides. A pair of ramp plates diverge from opposite sides of the base and interconnect the base to the lower surface of the bed.

In accordance with a still further aspect of the present invention, a tugger cart is provided for transporting a load. The tugger cart includes a support frame having an end. A bed, having a center, is rotatably mounted to the support frame. The bed is rotatable about a bed axis perpendicular to the bed and extending through the center of the bed. A retractable pin is operatively connected to the support frame. The pin is movable along a vertical pin axis between an extended position and a retracted position. The pin axis is a predetermined radial distance from the bed axis. A locking plate is connected to the bed and has an aperture therethrough for receiving the pin in the extended position so as to maintain the bed in a predetermined position on the support frame. The aperture has a center being the predetermined radial distance from the bed axis.

The tugger cart may also include a handle assembly slidably connected to the support frame adjacent the end thereof. The handle assembly is movable toward and away from the ends of the support frame to a plurality of user selectable positions. The handle assembly includes a generally horizontal leg having a first end slidably connected to the support frame and an opposite second end. A lower arm projects from the leg and an upper arm is pivotably connected to the lower arm. The upper arm is pivotable between an extended position wherein the upper arm is generally co-planar with the lower arm in the retracted position. A locking structure is operatively connected to the support frame for locking the leg of the handle assembly in one of the user selected positions.

The handle assembly further includes a load support member extending from the lower arm. A bracing element extends between the leg and the load support member. The load support member includes a load support arm extending upwardly from the lower arm of the handle and a retaining plate extending vertically from a terminal end of the load support arm.

It is contemplated for the locking plate of the tugger cart to include a base having first and second opposite sides. A pair of ramp plates diverge from opposite sides of the base and interconnect the base of the locking plate to the lower surface of the bed.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 4 is a cross-sectional view of the tugger cart of the present invention taken along line 4-4 of FIG. 2;

FIG. 5 is a cross-sectional view of the tugger cart of the present invention taken along line 5-5 of FIG. 2;

FIG. 6 is a cross-sectional view of the tugger cart of the present invention taken along line 6-6 of FIG. 2;

FIG. 7 is a cross-sectional view of the tugger cart of the present invention taken along line 7-7 of FIG. 2;

FIG. 8 is a front elevational view showing a portion of the tugger cart of FIG. 1;

DETAILED DESCRIPTION OF THE DRAWINGS

Figure 1:
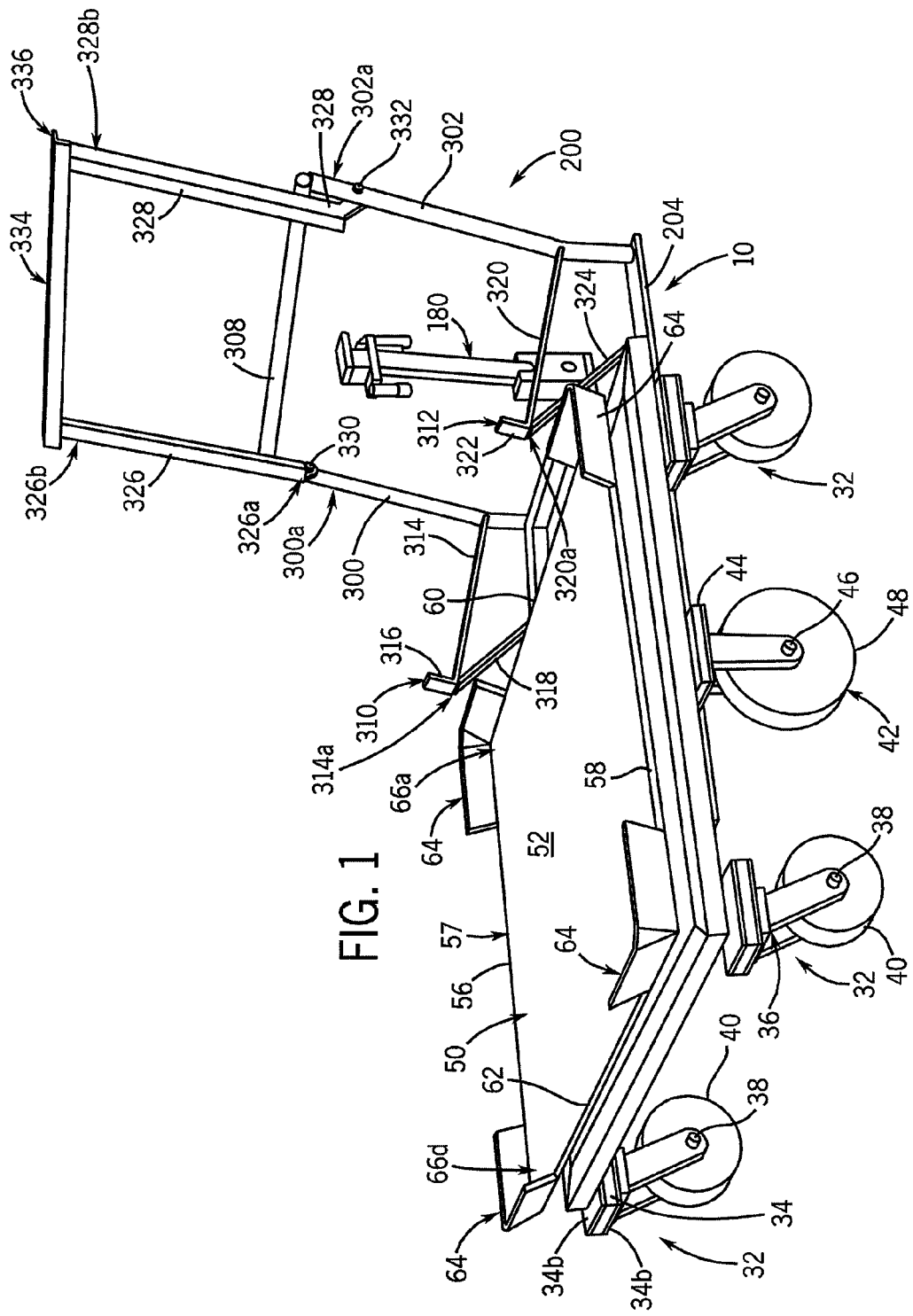
FIG. 1 is an isometric view of a tugger cart in accordance with the present invention.

Referring to FIG. 1, a tugger cart in accordance with the present invention is generally designated by the reference numeral 10. Tugger cart 10 includes a generally flat support frame 12 defined by first and second generally parallel side frame members 14 and 16, respectively, interconnected by leading and trailing frame members 20 and 22, respectively. Support frame 12 further includes first and second intermediate frame members 24 and 26, respectively, extending between side frame members 14 and 16. First and second intermediate frame members 24 and 26, respectively, are generally parallel to and spaced between leading and trailing frame members 20 and 22, respectively.

Support frame 12 of tugger cart 10 is supported above supporting surface 30 such as a factory floor or the like by a plurality of caster assemblies 32. Each caster assembly 32 includes a mounting plate 34 having upper and lower surfaces 34a and 34b, respectively. U-shaped brackets 36 depend from lower surfaces 34b of mounting plates 34 of caster assemblies 32. Axles 38 extend between the legs of U-shaped brackets 36 to rotatably support corresponding caster wheels 40 thereon. It is contemplated to mount each caster assembly 32 to support frame 12 about the periphery thereof. By way of example, caster assemblies 32 may be positioned adjacent the intersection of side frame member 16 and leading frame member 20; adjacent the intersection of leading frame member 20 and side frame member 16; adjacent the intersection of side frame member 16 and trailing frame member 22; and adjacent the intersection of trailing frame member 22 and side frame member 14.

In addition, enlarged caster assemblies 42 may be interconnected to side frame members 14 and 16 of support frame 12 at locations equidistant from leading frame member 20 and trailing frame member 22. Caster assemblies 42 include mounting plates 44 having legs depending therefrom. Axles 46 extend between the legs of caster assemblies 42 to rotatably support caster wheels 48 thereon. Caster wheels 48 of caster assemblies 42 have larger diameters than the diameters of caster wheels 40 of caster assemblies 32 in order to provide additional support for bed assembly 50, hereinafter described.

Bed assembly 50 includes platform 51 having a generally flat upper surface 52 and a generally flat lower surface 54 interconnected by sides 56 and 58, as well as, first and second ends 60 and 62, respectively. Generally V-shaped retaining elements 64 project vertically from corresponding corners 66a-d of platform 51. Retaining elements 64 are intended to maintain a load on upper surface 52 of platform 51.

Figure 2:
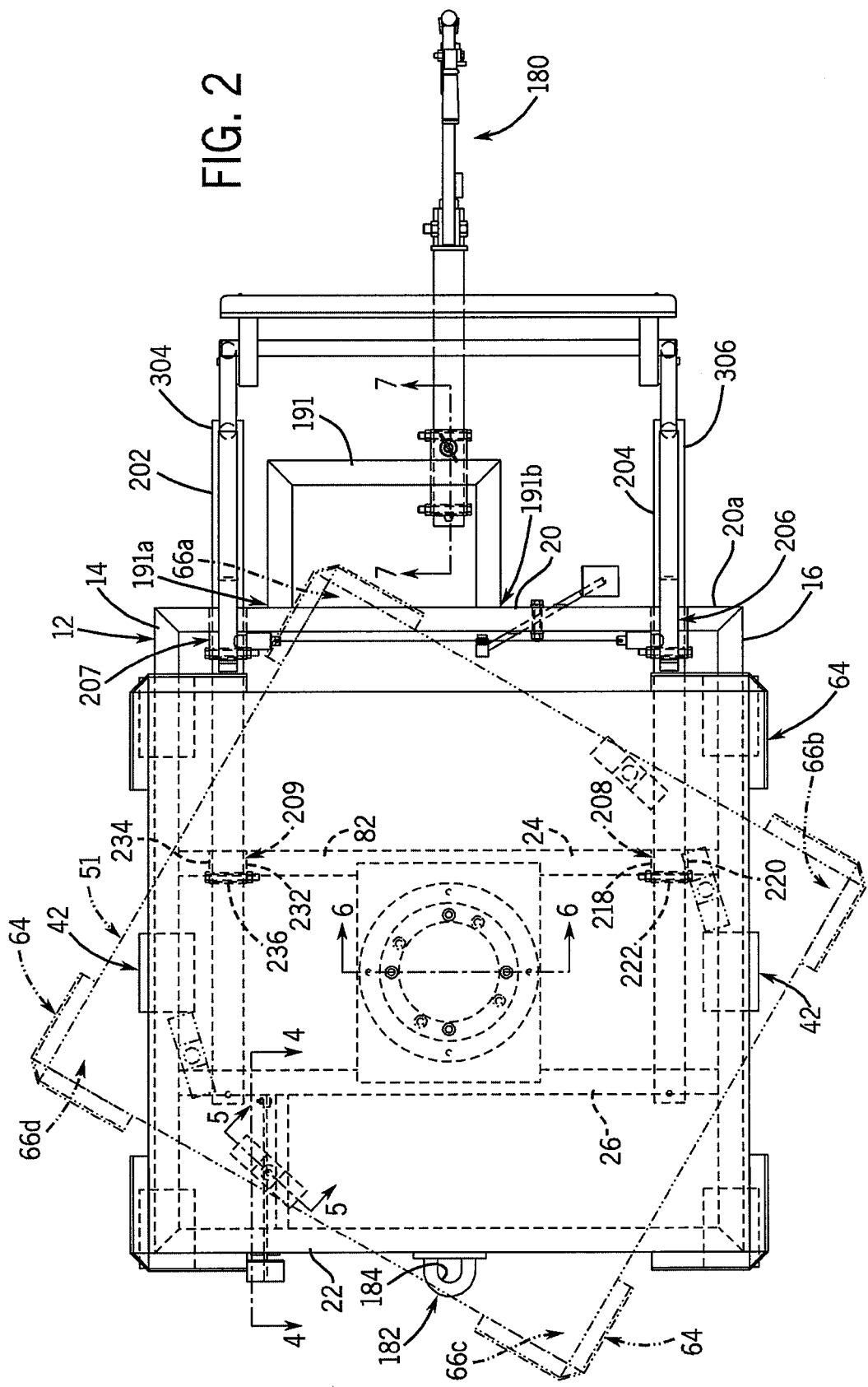
FIG. 2 is a top plan view of the tugger cart of the present invention.

As best seen in FIGS. 2 and 6, bed assembly 50 further includes inner bearing ring 68 interconnected to lower surface 54 of platform 51. Inner bearing ring 68 is defined by a generally circular inner surface 70 and a generally circular outer surface 72 spaced by upper and lower surfaces 74 and 76, respectively. Upper surface 74 of inner bearing ring 68 engages lower surface 54 of platform 51 and a plurality of screws 78 are threaded through platform 51 into inner bearing ring 68 so as to interconnect inner bearing ring 68 to platform 51. It is contemplated for the heads of screws 78 to be substantially flushed with upper surface 52 of platform 51.

Outer bearing ring 80 is interconnected to support plate 82 that, in turn, is mounted to the upper surfaces of intermediate frame members 24 and 26. Bottom surface 84 of support plate 82 may be fixed to upper surfaces of intermediate cross frame members 24 and 26 in any suitable manner such as by welding or the like. Outer bearing ring 80 includes a generally circular inner surface 86 defining circular cavity 88 having a diameter generally equal to the outer diameter of inner bearing ring 68. Outer bearing ring 80 is further defined by a generally circular outer surface 89 radially spaced from inner surface 86 by upper and lower surfaces 90 and 92, respectively. Outer bearing ring 80 is positioned on upper surface 94 of support plate 82 and interconnected thereto by a plurality of circumferentially spaced bolts 96 that extend through support plate 82 and into outer bearing ring 80 such that lower surface 92 of outer bearing ring 80 engages upper surface 94 of support plate 82.

In order to rotatably mount bed assembly 50 on support frame 12, bed assembly 50 is lowered onto support frame 12 such that inner bearing ring 68 is slidably received within cavity 88 defined by inner surface 86 of outer bearing ring 80. As described, outer surface 72 of inner bearing ring 68 forms a slidable interface with inner surface 86 of outer bearing ring 80 so as to allow platform 51 to rotate about vertical axis 100, FIG. 6, extending through the center of both cavity 88 and platform 51.

Referring to FIGS. 4-5, in order to secure bed assembly 50 at a user desired location and present further rotation of platform 51 about vertical axis 100, locking arrangement 102 is provided. Locking arrangement 102 includes pin housing 104 extending along vertical axis 105. Pin housing 104 includes an inner surface 158 defining a cavity for slidably receiving pin 140 therein and an outer surface affixed to first side 106 of longitudinally extending frame element 108. Frame element 108 extends between trailing frame member 22 and second intermediate frame member 26 and is interconnected thereto in any suitable manner such as by welding or the like. Vertical support 110 is interconnected to side 106 of frame member 108 and depends therefrom. Lower end 112 of support 110 is pivotably connected to terminal first end 114 of actuator bar 116 by bolt 118.

As best seen in FIG. 4, actuator bar 116 extends through an opening formed in a downwardly extending guide plate 124 and terminates at a second, opposite end 120 having foot engaging pedal 122 formed thereon, for reasons hereinafter described. Guide plate 124 includes inner surface 126 directed towards the interior of support frame 12 and an outwardly directed surface 128. The upper portion of inwardly directed surface 126 of guide plate 124 is interconnected to outer face 22a of trailing frame member 22. The lower portion of inwardly directed surface 126 of guide plate 124 includes a stop plate 130 that limits the path of travel of actuator bar 116 within the opening through guide plate 124, as hereinafter described.

Actuator bar 116 further includes first and second sides 132 and 134, respectively. Second side 134 of actuator bar 116 is positioned against and pivotably connected to lower end 138 of locking pin 140 by bolt 142. Nut 144 is threaded on terminal end 146 of bolt 142 in order to capture actuator bar 116 on lower end 138 of locking pin 140. Lower end 138 of locking pin 140 extends through an opening in closed end 150 of pin housing 104. Pin 140 includes enlarged head 154 having outer surface 156 that forms a slidable interface with inner surface 158 of pin housing 104. Enlarged head 154 of pin 140 terminates at an arcuate surface 160. Enlarged head 154 of pin 140 is interconnected to lower end 138 of pin 140 by spring receiving shaft 162. Coil spring 164 extends about pin receiving shaft 162 between closed end 150 of pin housing 104 and enlarged head 154 of pin 140. Spring 164 urges pin 140, and hence, actuator bar 116 towards a locking position wherein a portion of enlarged head 154 of pin 140 projects from pin housing 104. It can be appreciated that by pivoting actuator bar 116 from a locking position to an unlocking position, shown in phantom in FIG. 4, actuator bar 116 will pull locking pin 140 to its unlocking position wherein pin head 154 of pin 140 is predominately received within pin housing 104. Upon release of actuator bar 116, coil spring 164 biases pin 140 and actuator bar 116 back to their locking position.

In order to secure platform 51 at a user desired location about vertical axis 100, locking brackets 170 are provided. Locking brackets 170 are circumferentially spaced about lower surface 54 of platform 51, as hereinafter described. Each locking bracket 170 includes generally flat base 172 lying in a plane generally parallel to and vertically spaced from lower surface 54 of platform 51. Bases 172 of locking brackets 170 include locking aperture 174 therethrough adapted for receiving enlarged head 154 of pin 140. Locking brackets 170 further include first and second ramp plates 176 and 178, respectively, diverging from opposite sides of bases 172. Ramp plates 176 and 178 of locking brackets 170 terminate at corresponding ends 176a and 178a, respectively, which are interconnected to lower surface 54 of platform 51. Locking brackets 170 are interconnected to lower surface 54 of platform 51 at locations wherein apertures 174 through locking brackets 170 are the same radial distance from vertical axis 100 as the distance between vertical axis 105 from vertical axis 100.

In operation, it is contemplated for actuator bar 116 to be in its locking position such that locking pin 140 is received within aperture 174 in a corresponding locking bracket 170. A user may engage foot engaging pedal 122 to urge actuator bar 116 from its locking to its unlocking position. As a result, pin 140 is withdrawn from aperture 174 through corresponding locking bracket 170 thereby allowing platform 51 to rotate about vertical axis 100, as heretofore described. Thereafter, a user may release actuator bar 116 so as to allow locking pin 140 to return to its locking position. As platform 51 is rotated about vertical axis 100, arcuate surface 160 of enlarged head 154 of locking pin 140 engages a corresponding ramp plate 176 or 178 (depending on the direction of rotation of platform 51) of a subsequent locking bracket 170 attached to lower surface 54 of platform 51. Arcuate surface 160 of enlarged head 154 of locking pin 140 slides along a corresponding ramp plate 176 or 178 so as to urge locking pin 140 towards its unlocking position. With locking pin 140 axially aligned with locking aperture 174 in base 172 of a desired locking bracket 170, coil spring 164 biases locking pin 140 back to its locking position thereby maintaining platform 51 in such position. Alternatively, a user may maintain actuator bar 116 in its unlocking position until such point as locking pin 140 is axially aligned with a user desired locking aperture 174 through base 172 of a corresponding locking bracket 170. Thereafter, actuator bar 116 may be released such that coil spring 164 biases locking pin 140 and actuator bar 116 to their locking positions, thereby maintaining platform 51 at a user desired location. Thereafter, if a user desires that the position of platform 51 may readjusted, the process may be repeated as heretofore described.

Figure 3:
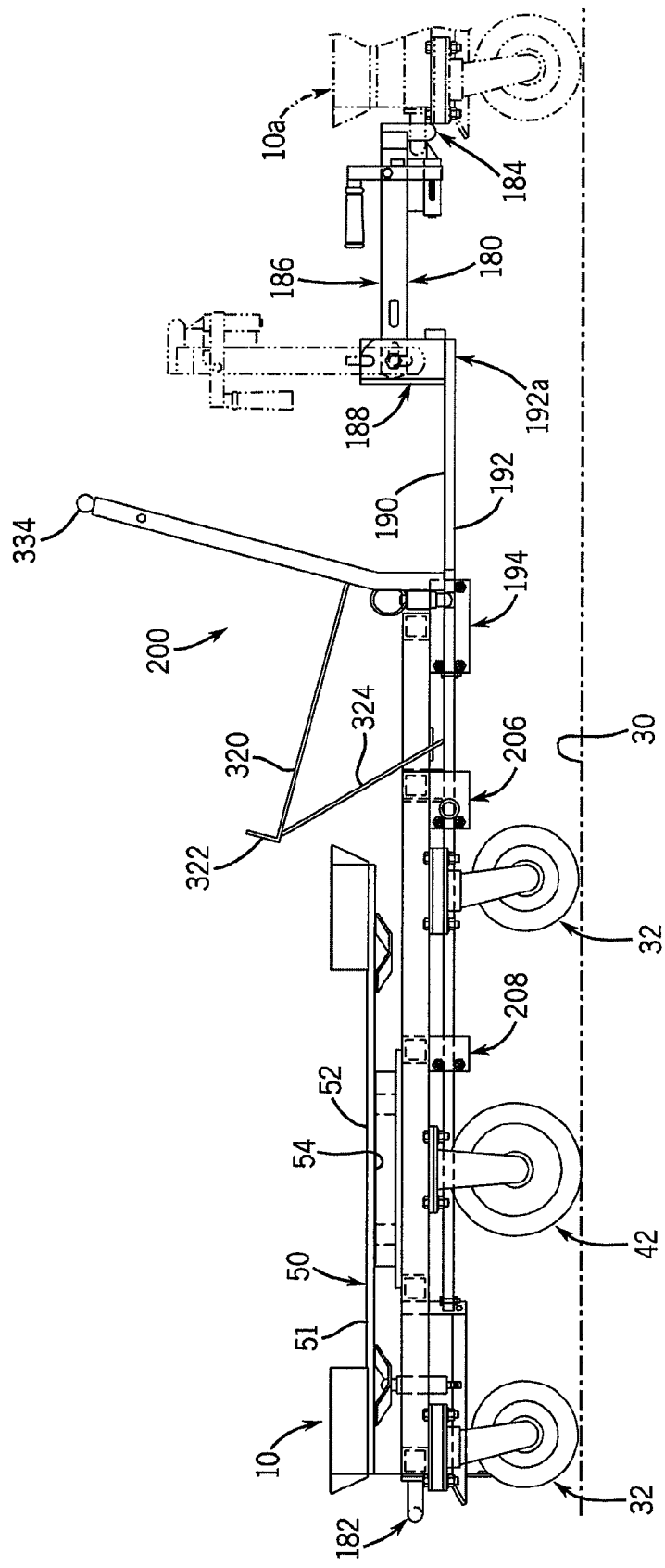
FIG. 3 is a side elevational view of a plurality of interconnected tugger carts in accordance with the present invention.

Tugger cart 10 further includes a connection device 180 for interconnecting tugger cart 10 to a leading tugger cart 10a, FIG. 3. It can be appreciated that tugger carts 10 and 10a are identical in structure, and as such, the description of tugger cart 10 is understood to describe tugger cart 10a as if fully described herein. Connection device 180 includes a generally U-shaped striker element 182 projecting from trailing frame member 22, FIG. 2. U-shaped striker element 182 defines a passageway 184 therethrough for receiving pin member 182 of a coupling assembly generally designated by the reference numeral 186. Coupling assembly 186 is fully described in [now ending U.S. patent application Ser. No. 10/405,396] U.S. Pat. No. 7,004,489, assigned to the assignee of the present application, and incorporated herein by reference.

Connection bracket 188 of coupling assembly 186 is mounted to upper surface 190 of extension plate 192 adjacent first end 192a thereof. Extension plate 192 extends along a horizontal axis and includes one or more apertures 187 therethrough, for reasons hereinafter described. Second end 192b of extension plate 192 extends through support structure 194 depending from lower surface 189 of tubular frame member 191. Upper surface 196a of upper support plate 186 of support structure 194 is interconnected to lower surface 189 of tubular frame member 191 in any suitable material such as by welding or the like. Tubular frame member 191 is generally U-shaped and includes first and second ends 191a and 191b interconnected to and horizontally spaced along leading surface 20a of leading frame member 20 such that tubular frame member lies in a plane generally parallel to platform 51.

Support structure 194 includes upper and lower support plates 196 and 198, respectively, that define cavity 193 therebetween. Upper and lower support plates 196 and 198, respectively, include corresponding axially aligned openings 195 and 197 therein, for reasons hereinafter described. Support structure 194 further includes upper and lower forward rollers 199 and 201, respectively, that are vertically spaced from each other by a height generally equal to the thickness t of extension plate 192. Forward rollers 199 and 201 extend along and are rotatable about corresponding horizontal axes. Support structure 194 further includes first and second vertically spaced rear rollers 203 and 205, respectively. Rear rollers 203 and 205 are vertically spaced by a height generally equal to the thickness t of plate 192. It can be appreciated that rear rollers 203 and 205 extend along and are rotatable about corresponding horizontal axes.

In operation, it may be desirable to adjust the position of coupling assembly 186 of tugger cart 10 in order to couple tugger cart 10 to U-shape striker 182 of adjacent leading tugger cart 10a. As such, extension plate 192 may be slid axially through support structure 194 to a used desired position wherein one of the one or more apertures 187 through extension plate 192 is axially aligned with openings 195 and 197 through upper and lower support plates 196 and 198, respectively, of support structure 194. It can be appreciated that forward rollers 199 and 201, as well as, rear rollers 203 and 205, in support structure 194 facilitate the sliding of extension plate 192 therethrough. Once the one of the one or more apertures 187 through extension plate 192 is axially aligned with openings 195 and 197 through upper and lower support plates 196 and 198, respectively, of support structure 194, locking pin 211 that is tethered by lead line 213 to tubular frame member 191 may be inserted into the one of the one or more apertures 187 in extension plate 192 through one or both of openings 195 and 197 through upper and lower support plates 196 and 198, respectively. This, in turn, maintains extension plate 192, and hence coupling assembly 186, in the user desired position.

Referring to FIGS. 1-3, tugger cart 10 further includes a handle assembly generally designated by the reference numeral 200 that is movable toward and away from leading frame member 20. Handle assembly 200 includes first and second generally flat bases 202 and 204, respectively. Base 202 is slidably supported by leading and trailing support structures 206 and 208, respectively. Similarly, base 204 of handle assembly 200 is slidably supported by leading and trailing support structures 207 and 209, respectively. Leading support structure 206 is defined by first and second vertical sidewalls 210 and 212 depending from lower surface 20b of leading frame member 20. Vertical walls 210 and 212 of leading support structure 206 are interconnected by upper and lower rollers 214 and 216, respectively. Outer surfaces 214a and 216a of upper and lower rollers 214 and 216, respectively, define a passageway therebetween for slidably receiving base 202. Similarly, trailing support structure 208 includes first and second vertical sidewalls 218 and 220, respectively, depending from the lower surface of intermediate frame member 24 that are interconnected by vertically spaced upper and lower rollers 222. The outer surfaces of upper and lower rollers 222 of trailing support structure 208 define a passageway therebetween for slidably receiving base 202 of handle assembly 200.

Leading support structure 207 includes first and second vertical sidewalls 224 and 226, respectively, depending from lower surface 20b of leading frame member 20. Sidewalls 224 and 226 of leading support structure 202 are interconnected by upper and lower rollers 228 and 230, respectively, that are rotatable about corresponding horizontal axes. Upper and lower rollers 228 and 230, respectively, of leading support structure 207 include outer surfaces 228a and 230a that define a passageway therebetween for slidably receiving base 204 of handle assembly 200 therethrough. Trailing support structure 209 includes first and second vertical sidewalls 232 and 234, respectively, depending from the lower surface of intermediate frame member 24. First and second sidewalls 232 and 234, respectively, are interconnected by upper and lower horizontally extending rollers 236 that define a passageway therebetween for slidably receiving base 204 of handle assembly 200 therethrough.

Figure 9:
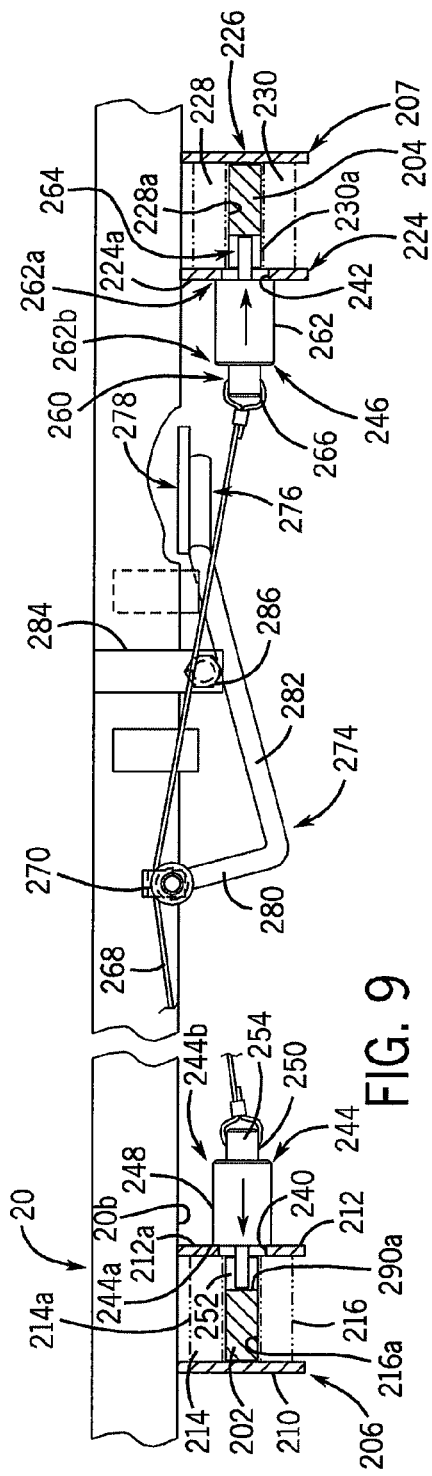
FIG. 9 is a cross-sectional view of the tugger cart of the present invention taken along line 9-9 of FIG. 8 showing a handle release mechanism in a first released position.
Figure 10:
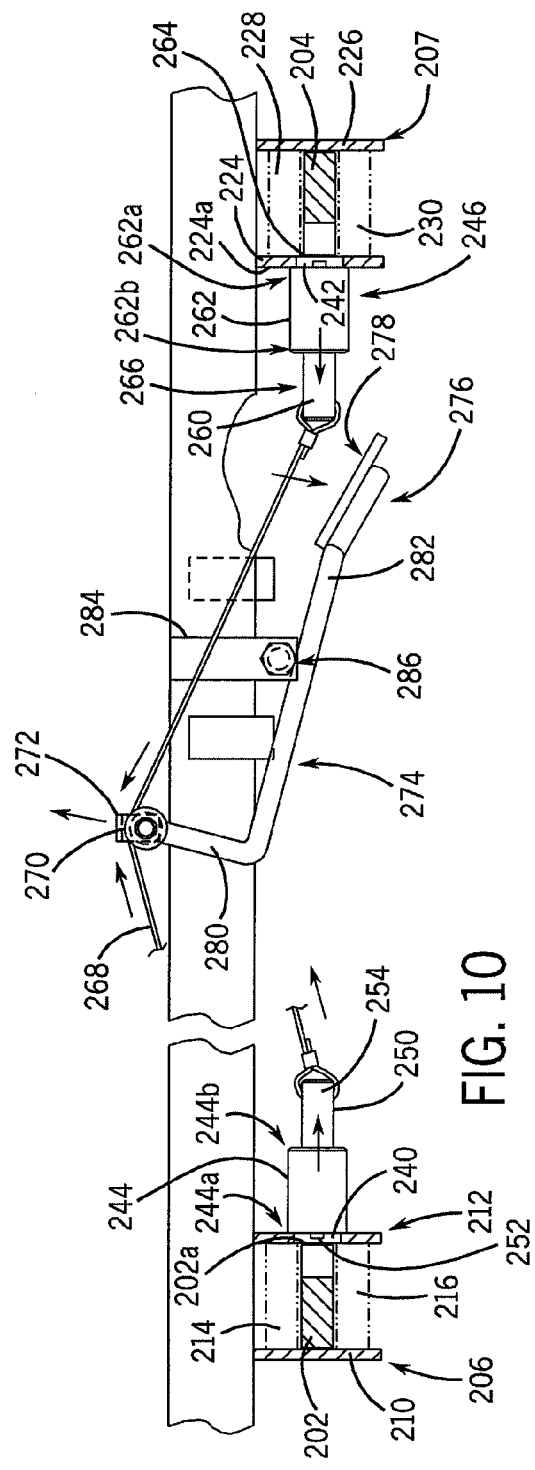
FIG. 10 is a cross-sectional view, similar to FIG. 9, showing the handle release mechanism of the tugger cart of the present invention in a second, depressed position.

Sidewall 212 of leading support structure 206 and sidewall 204 of leading support structure 207 include corresponding apertures 240 and 242, respectively, which lie along a common axis. Pin structures 244 and 246 are mounted to the outer surfaces 212a and 224a of corresponding sidewalls 212 and 224 of leading support structures 206 and 207, respectively. Pin structure 244 includes a pin housing 248 that slidably receives a pin member 250 therein. Pin member 250 includes a first end 252 that projects from a first end 244a of pin housing 244 and a second opposite end 254 that projects from a second end 244b of pin housing 244. Pin member 250 is movable between an extended position, FIG. 9, wherein second end 252 of pin member 250 projects into the passageway between upper and lower rollers 214 and 216, respectively, and a retracted position, FIG. 10, where second end 252 of pin member 250 is removed from the passageway between upper and lower rollers 214 and 216, respectively. It is contemplated for pin member 250 to be biased toward the extended position, FIG. 9.

Pin structure 246 includes pin member 260 slidably received within a chamber through pin housing 262. Pin member 260 includes a first end 264 projecting from first end 262a of pin housing 262 and a second end 266 projecting from second, opposite end 262b of pin housing 262. Pin member 260 is slidable between a first extended position, FIG. 9, wherein first end 264 of pin member 260 extends into the passageway between upper and lower rollers 228 and 230, respectively, of leading support structure 207 and a retracted position, FIG. 10, wherein first end 264 of pin member 260 is retracted from the passageway between upper and lower rollers 228 and 230, respectively, of leading support structure 207.

Second ends 254 and 266 of pin members 250 and 260, respectively, are interconnected by cable 268. Cable 268 extends over roller 270 that is rotatably mounted to terminal end 272 of a generally L-shaped actuating lever 274. Lever 274 includes a second opposite end 276 having a foot engaging pedal 278 mounted thereon. First and second ends 272 and 276, respectively, of lever 274 are interconnected by first and second arms 280 and 282, respectively, at right angles to each other. Arm 282 is pivotably connected to a generally U-shaped bracket 284 depending from leading frame member 20 by bolt 286. As described, lever 274 is pivotable between a first position, FIG. 9, wherein pin members 250 and 260 are in their extended position, and a second, depressed position, FIG. 10, wherein pin 250 and 260 are in their retracted position.

In operation, base 202 of handle assembly 200 is slidably received within upper and lower rollers 214 and 216, respectively, of leading support structure 206 and between upper and lower rollers 222 of trailing support structure 208. Similarly, base 204 of handle assembly 200 is slidably received between upper and lower rollers 228 and 230, respectively, of leading support structure 207 and between upper and lower rollers 236 of trailing support structure 209. As best seen in FIG. 8, base 202 of handle assembly 200 includes a plurality of longitudinally spaced notches 290a-290b in first side 202a thereof. Similarly, base 204 of handle assembly 200 includes a plurality of longitudinally spaced notches 292a-292b in side 204a. Notches 290a-290b and base 202 of handle assembly 200 are axially aligned with corresponding notches 292a-292b in base 204 of handle assembly 200. As described, with lever 274 in the depressed position, bases 202 and 204 are free to slide axially within passageways through corresponding leading support structures 206 and 207, respectively, and within passageways through trailing structures 208 and 209, respectively. As a result, bases 202 and 204 of handle assembly 200 may be slid to a user desired position, wherein axially aligned, user selected notches 290a and 292a in bases 202 and 204, respectively, of handle assembly 200 are aligned with apertures 240 and 242 in corresponding support walls 212 and 224, respectively, of leading support structures 206 and 207, respectively. Thereafter, lever 274 may be released so as to return to its first position wherein second ends 252 and 264 of pin members 250 and 260, respectively, are in their extended position, FIG. 9, and received into corresponding notches 290a and 292a in bases 202 and 204, respectively, thereby locking bases 202 and 204, and hence handle assembly 200, in the user desired position. In order to readjust the location of handle assembly 200, lever 274 may be again pivoted to the depressed position, FIG. 10, and the process is repeated.

Referring to FIG. 1, handle assembly 200 further includes generally vertical, lower handle elements 300 and 302 extending from corresponding upper surfaces 304 and 306 of corresponding bases 202 and 204, respectively. Upper ends 300a and 302a of lower handle elements 300 and 302, respectively, of handle assembly 200 are interconnected by a generally horizontal handle 308. Handle assembly 200 further includes first and second load support members 310 and 312, respectively. Load support member 310 includes an upwardly sloping, load support arm 314 extending from lower handle element 300 toward the trailing end of tugger cart 10. A generally vertical load retention plate 316 extends vertically from the terminal end 314a of load support arm 314 in order to retain a load thereon. Bracing arm 318 extends between terminal end 314a of load support arm 314 and upper surface 304 of base 202. Similarly, load support member 312 includes upwardly sloping, load support arm 320 extending from lower handle element 302 that is generally parallel to load support arm 314. Load retention plate 322 extends vertically from terminal end 320a of load support arm 320 so as to maintain a load thereon. Terminal end 320a of load support arm 320 is interconnected to upper surface 306 of base 204 by bracing element 324. It can be appreciated that a load, such as a parcel, box or the like, may be positioned on load support arms 314 and 320 during use of tugger cart 10.

Handle assembly 200 further includes generally parallel upper arms 326 and 328 having lower ends 326a and 328a pivotably connected to upper ends 300a and 302a, of lower handle elements 300 and 302, respectively, by bolts 330 and 332, respectively. Upper ends 326b and 328b of upper arms 326 and 328, respectively, are interconnected by a generally horizontal connection arm 334. Upper arms 322 and 326 and connection arm 334 define a load supporting frame generally designed by the reference numeral 336. Load support frame 336 is pivotable between a retracted position wherein upper arm members 326 and 328 are adjacent corresponding lower arm members 300 and 302, respectively, and an extended position wherein upper arm members 326 and 328 are in engagement with handle 308. In its extended position, a plurality of loads, such as boxes, may be stacked on load support arms 314 and 320 and balanced against upper arm elements 326 and 328 and/or connection arm 334.

Various modes of carrying out the invention are contemplated as being within the scope of the following claims particularly pointing out and distinctly claiming the subject matter that is regarded as the invention.

I claim:

1. A tugger cart for transporting a load, comprising:
a support frame having a leading end and a trailing end;
a bed having a center and being rotatably mounted to the support frame, the bed rotatable about a bed axis perpendicular to the bed and extending through the center of the bed;
a wheel assembly operatively connected to the support frame for supporting the support frame above a supporting surface;
a handle assembly slidably connected to the support frame, the handle assembly movable between a first retracted position and a second extended position;
a load support member extending from the handle assembly in a direction toward the bed, the load support member including a load support arm having an upper surface for receiving a portion of the load thereon; and
a bracing element having a first end operatively connected to the handle assembly and a second end operatively connected to the load support arm;
wherein the second end of the bracing element and the support frame define an opening therebetween so as allow the unobstructed rotation of the bed about the axis.

2. The tugger cart of claim 1 wherein the handle assembly includes:
a generally horizontal leg having a first end slidably connected to the support frame and an opposite, second end;
a lower arm projecting from the leg; and
an upper arm pivotably connected to the lower arm.

3. The tugger cart of claim 2 further comprising a locking structure operatively connected to the support frame for locking the leg of the handle assembly in a user desired position.

4. The tugger cart of claim 2 wherein the load support arm extends upwardly from the lower arm of the handle assembly and wherein the load support member includes a retaining plate extending vertically from a terminal end of the load support arm.

5. The tugger cart of claim 1 further comprising a bed locking structure for locking the bed at a selected position on the support frame.

6. The tugger cart of claim 5 wherein the bed locking structure includes:

a retractable pin operatively connected to the support frame and being movable along a vertical pin axis between an extended position and a retracted position, the pin axis being a predetermined radial distance from the bed axis; and a locking plate connected to the bed and having an aperture therethrough for receiving the retractable pin.

7. A tugger cart for transporting a load, comprising:

a support frame having an end;

a bed received on the support frame and rotatable about an axis;

a wheel assembly operatively connected to the support frame for supporting the support frame above a supporting surface;

a handle assembly slidably connected to the support frame adjacent the end thereof, the handle assembly movable toward and away from the end of the support frame to a plurality of user selectable positions;

a load support member extending from the handle assembly in a direction toward the bed, the load support member including a load support arm having an upper surface for receiving a portion of the load thereon; and a bracing element having a first end operatively connected to the handle assembly and a second end operatively connected to the load support arm;

wherein the second end of the bracing element and the support frame define an opening therebetween so as allow the unobstructed rotation of the bed about the axis.

8. The tugger cart of claim 7 wherein the handle assembly includes:

a generally horizontal leg having a first end slidably connected to the support frame and an opposite, second end;

a lower arm projecting from the leg; and an upper arm pivotably connected to the lower arm.

9. The tugger cart of claim 8 further comprising a locking structure operatively connected to the support frame for locking the leg of the handle assembly in one of the user selectable positions.

10. The tugger cart of claim 8 wherein the load support arm extends upwardly from the lower arm of the handle assembly and wherein the load support member includes a retaining plate extending vertically from a terminal end of the load support arm.

11. The tugger cart of claim 7 wherein the bed:

has a center;

lies in a generally horizontal plane; and is rotatable on the support frame about a vertical bed axis extending through the center of the bed.

12. The tugger cart of claim 11 further comprising a bed locking structure for locking the bed at a selected position on the support frame.

13. The tugger cart of claim 12 wherein the bed locking structure includes:

a retractable pin operatively connected to the support frame and being movable along a vertical pin axis between an extended position and a retracted position, the pin axis being a predetermined radial distance from the bed axis; and a locking plate connected to the bed and having an aperture therethrough, the aperture have a center being the predetermined distance from the bed axis.

14. The tugger cart of claim 13 wherein the locking plate includes:

a horizontal base having first and second opposite sides; and a pair of ramp plates diverging from opposite sides of the base and interconnecting the base to a lower surface of the bed.

15. A tugger cart for transporting a load, comprising:

a support frame having an end;

a bed having a center and being rotatably mounted to the support frame, the bed rotatable about a bed axis perpendicular to the bed and extending through the center of the bed;

a retractable pin operatively connected to the support frame and being movable along a vertical pin axis between an extended position and a retracted position, the pin axis being a predetermined radial distance from the bed axis;

a locking plate connected to the bed and having an aperture therethrough for receiving the pin in the extended position so as to maintain the bed in a predetermined position on the support frame, the aperture having a center being the predetermined distance from the bed axis;

wherein the locking plate includes:

a horizontal base having first and second opposite sides, the aperture extending through the base; and a pair of ramp plates diverging from opposite sides of the base and interconnecting the base to a lower surface of the bed;

a handle assembly slidably connected to the support frame adjacent the end thereof, the handle assembly movable toward and away from the end of the support frame to a plurality of user selectable positions and including:

a generally horizontal leg having a first end slidably connected to the support frame and an opposite, second end;

a lower arm projecting from the leg;

an upper arm pivotably connected to the lower arm; and a load support member extending from the lower arm; and a locking structure operatively connected to the support frame for locking the leg of the handle assembly in one of the user selectable positions;

wherein the pin is engageable with the ramp plates and the horizontal base.

16. The tugger cart of claim 15 wherein the handle assembly further includes a bracing element extending between the leg and the load support member.

17. The tugger cart of claim 15 wherein the load support member includes a load supporting arm extending upwardly from the lower arm of the handle assembly and a retaining plate extending vertically from a terminal end of the load support arm.

* * * * *